(12) United States Patent
Aoki (10) Patent No.: US 7,324,351 B2
(45) Date of Patent: Jan. 29, 2008

(54) DISPLAY, WIRING BOARD, AND METHOD OF MANUFACTURING THE SAME

(75) Inventor: Yoshiro Aoki, Kitamoto (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 174 days.

(21) Appl. No.: 11/174,538

(22) Filed: Jul. 6, 2005

(65) Prior Publication Data

US 2005/0241853 A1 Nov. 3, 2005

Related U.S. Application Data

(63) Continuation of application No. PCT/JP04/000814, filed on Jan. 29, 2004.

(30) Foreign Application Priority Data

Jan. 30, 2003 (JP) .............................. 2003-022507

(51) Int. Cl.
*H05K 7/00* (2006.01)
(52) U.S. Cl. ..................................... 361/777
(58) Field of Classification Search ............... 361/777; 174/255, 260, 261
See application file for complete search history.

(56) References Cited

U.S. PATENT DOCUMENTS

| | | | | |
|---|---|---|---|---|
| 6,172,305 | B1 * | 1/2001 | Tanahashi | 174/255 |
| 6,512,181 | B2 * | 1/2003 | Okubo et al. | 174/255 |
| 2003/0168254 | A1 * | 9/2003 | Kariya et al. | 174/261 |
| 2003/0178726 | A1 * | 9/2003 | Ogawa et al. | 257/758 |
| 2004/0191491 | A1 * | 9/2004 | Sugaya et al. | 428/209 |

FOREIGN PATENT DOCUMENTS

| | | |
|---|---|---|
| JP | 2-193112 | 7/1990 |
| JP | 4-221926 | 8/1992 |
| JP | 6-222378 | 8/1994 |
| JP | 7-37801 | 2/1995 |
| JP | 8-22024 | 1/1996 |
| JP | 8-62612 | 3/1996 |
| JP | 9-113932 | 5/1997 |
| JP | 10-39329 | 2/1998 |
| JP | 10-198285 | 7/1998 |
| JP | 10-221707 | 8/1998 |

(Continued)

*Primary Examiner*—Dean A. Reichard
*Assistant Examiner*—Abiy Getachew
(74) *Attorney, Agent, or Firm*—Oblon, Spivak, McClelland, Maier & Neustadt, P.C.

(57) ABSTRACT

Provided is a wiring board including an insulating substrate with a first region and a second region adjacent to each other on a major surface, signal line groups arrayed on the first region, and connection portions arranged on the second region in correspondence with the signal line groups, wherein each connection portion includes first to third terminal groups, a first wiring line group connecting the first terminal group to the corresponding signal line group, a second wiring line group connected to the second terminal group, and a third wiring group connected to the third terminal group, wherein the second and third wiring line groups are connected to each other between each adjacent connection portions, and all of the connection portions are the same in shapes of the first to third terminal groups and the first to third wiring line groups.

13 Claims, 11 Drawing Sheets

FOREIGN PATENT DOCUMENTS

| | | |
|---|---|---|
| JP | 11-168270 | 6/1999 |
| JP | 11-289025 | 10/1999 |
| JP | 11-305182 | 11/1999 |
| JP | 2000-29053 | 1/2000 |
| JP | 2000-112383 | 4/2000 |
| JP | 2000-323600 | 11/2000 |
| JP | 2002-116451 | 4/2002 |
| KR | 2002-0010215 | 2/2002 |

* cited by examiner

DISPLAY, WIRING BOARD, AND METHOD OF MANUFACTURING THE SAME

CROSS REFERENCE TO RELATED APPLICATIONS

This is a Continuation Application of PCT Application No. PCT/JP2004/000814, filed Jan. 29, 2004, which was published under PCT Article 21(2) in Japanese.

This application is based upon and claims the benefit of priority from prior Japanese Patent Application No. 2003-022507, filed Jan. 30, 2003, the entire contents of which are incorporated herein by reference.

BACKGROUND OF THE INVENTION

1. Field of the Invention

The present invention relates to a display, wiring board, and method of manufacturing the same.

2. Description of the Related Art

In a display such as a liquid crystal display or organic EL (Electroluminescent) display, wiring line groups of flexible tapes are connected to OLB (Outer Lead Bonding) pad groups formed on a display panel to make it possible to supply a power or signal from the outside of the display panel to circuits in the panel. For example, in a display on which a control driver is COG (Chip On Glass)-mounted, wiring lines are laid out on a glass substrate such that wiring line groups which connect video signal line groups (or video signal line driver) or scan signal driver to OLB pad groups arranged on one side of the glass substrate are formed. Accordingly, all electrical connections between the interior and exterior of the display panel can be realized on one side of the rectangular display panel.

In manufacturing the above-described display, pixel circuits in the display region or OLB pad groups and wiring line groups in the peripheral region are formed by using a photolithography process. A substrate used in a display is much larger than that used in a semiconductor device. For this reason, in manufacturing a display, it is difficult to execute full plate exposure for the entire display region and peripheral region. Hence, the display region or peripheral region is segmented into a plurality of parts, and exposure is sequentially executed for the parts.

More specifically, a plurality of patterns are formed on one reticle. Exposure with one pattern is repeated. Next, exposure with another pattern is repeated. When exposure of all the patterns formed on the reticle is ended, the reticle is exchanged. Still other patterns sequentially undergo exposure.

As described above, in the display manufacturing process, a complex exposure step is necessary, and the exposure step requires long time. Switching between patterns formed on the same reticle takes not so long time as reticle exchange. To shorten the time required for the exposure step, all patterns may be formed on one reticle. In this case, however, the size of each pattern must be reduced. As a result, since the number of times of exposure (the number of shots) increases, the time required for the exposure step cannot be shortened.

Jpn. Pat. Appln. KOKAI Publication No. 2000-112383 discloses a prior art related to the present invention.

This reference is related to a display on which a plurality of driver ICs are COG-mounted. To decrease the number of pads on the flexible tape or the number of pads on the panel, the input terminals of the driver ICs are appropriately distributed to two end portions of the array direction of the driver ICs. More specifically, one pad can input a signal to two adjacent driver ICs.

However, this reference includes no description about the above-described problem in the exposure step. In this reference, only the structure of the intermediate portion of the array, which the driver ICs form, is described, and the structure of the end portions of the array is not described. Additionally, in the structure described in this reference, each of wiring lines running in the array direction of the driver ICs is connected to a power supply or signal source.

BRIEF SUMMARY OF THE INVENTION

It is an object of the present invention to minimize the number of mask patterns to be used in a photolithography process in manufacturing a display or a wiring board used for it, thereby shortening the time necessary for the exposure step.

It is another object of the present invention to reduce the variation in wiring pattern shape caused by the manufacturing process, and in the field of displays, realize a higher display quality.

According to a first aspect of the present invention, there is provided a method of manufacturing a wiring board comprising an insulating substrate which includes a first and second regions adjacent to each other in one major surface, signal lines arrayed on the first region, and wiring patterns which is arrayed on the second region and each includes a first connection wiring line connecting the signal line to a signal input terminal, a second connection wiring line electrically disconnected from the signal line, and a third connection wiring line electrically disconnected from the signal line, the second and third connection wiring lines being connected to each other between each adjacent wiring patterns, and all of the signal lines being connected to the first connection wiring lines of the wiring patterns, comprising forming each of the wiring patterns by a photolithography process, wherein, in the photolithography process, pattern exposure using a single photomask which includes a pattern having a shape corresponding to part of the wiring patterns is sequentially executed for all parts of the second region.

According to a second aspect of the present invention, there is provided a wiring board comprising an insulating substrate which includes a first and second areas adjacent to each other in one major surface, signal line groups each of which includes first signal lines arrayed in a first direction on the first region and which are arrayed in the first direction, and connection portions each of which is arranged on the second region in correspondence with the signal line group, wherein each of the connection portions comprises first to third terminal groups, a first wiring line group connecting the first terminal group to the corresponding signal line group, a second wiring line group connected to the second terminal group, and a third wiring group connected to the third terminal group, wherein the second and third wiring line groups are connected to each other between each adjacent connection portions, and wherein all of the connection portions are the same in shapes of the first to third terminal groups and the first to third wiring line groups.

According to a third aspect of the present invention, there is provided a display comprising the wiring board according to the second aspect, and display elements connected to the pixel circuits, respectively.

DETAILED DESCRIPTION OF THE INVENTION

Several embodiments of the present invention will be described below in detail with reference to the accompanying drawings. The same reference numerals denote the same or similar constituent elements throughout the drawings, and a repetitive description thereof will be omitted.

Figure 1:
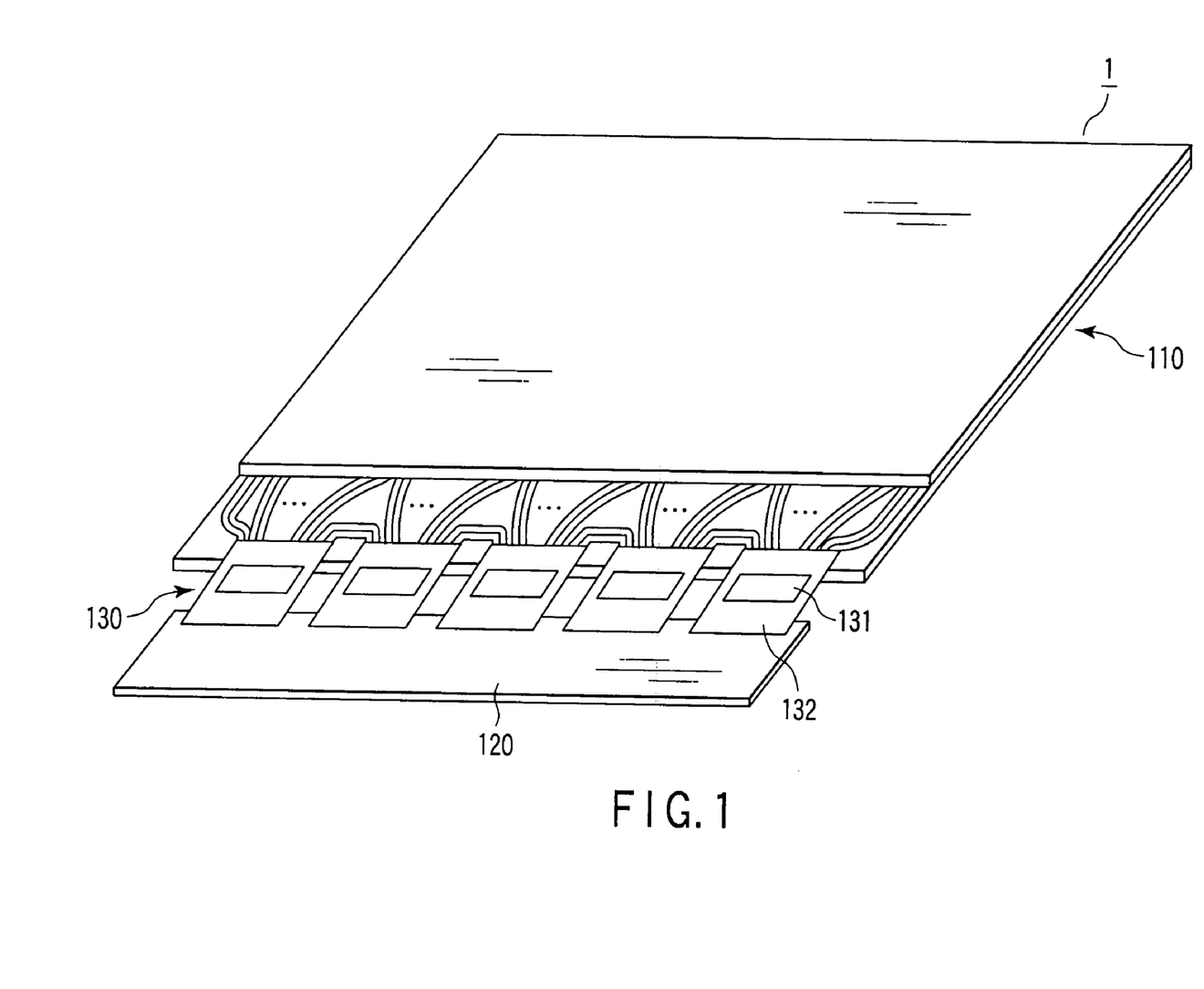
FIG. 1 is a perspective view schematically showing a display according to the first embodiment of the present invention.
Figure 2:
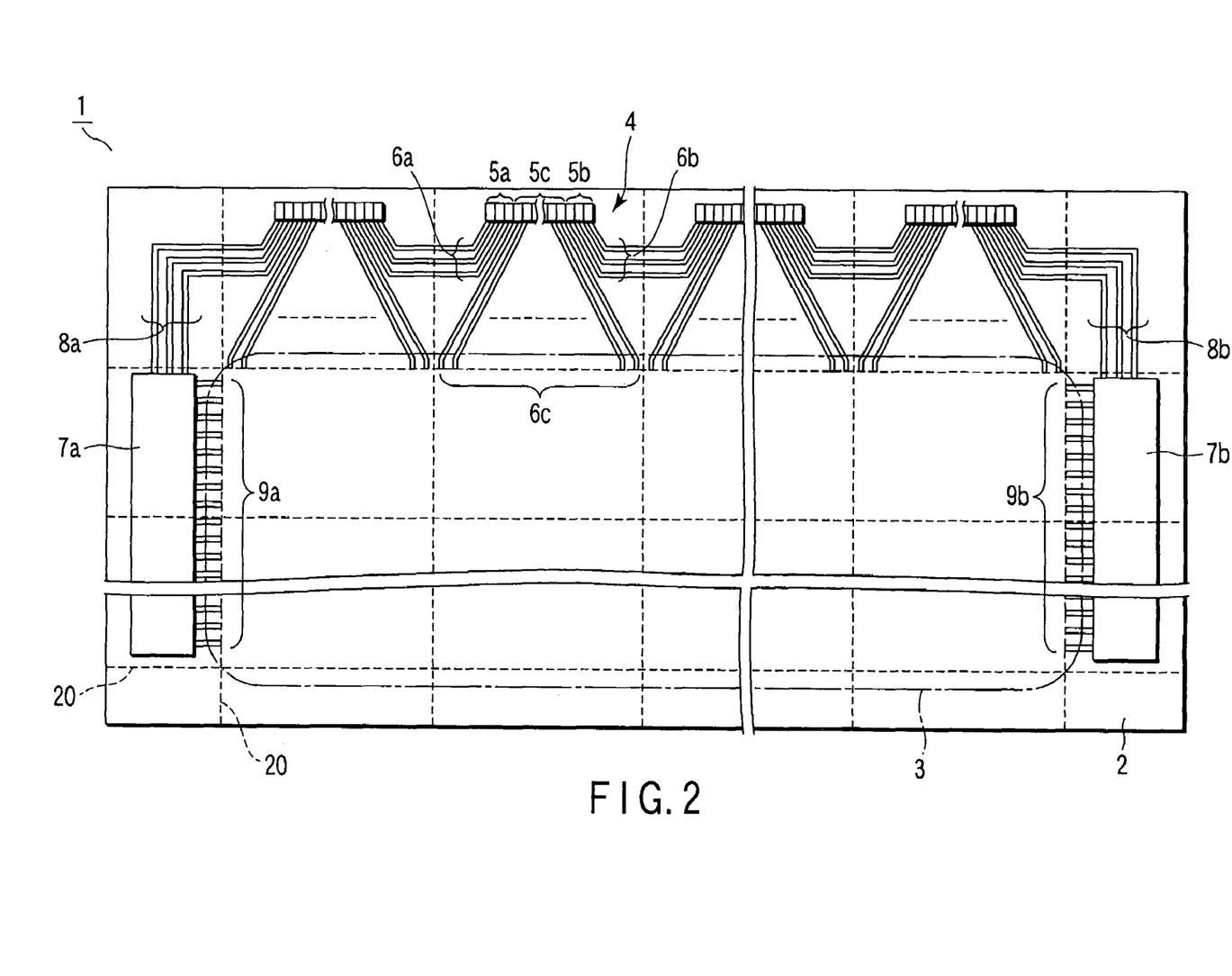
FIG. 2 is a plan view schematically showing part of the display shown in FIG. 1.

FIG. 1 is a perspective view schematically showing a display according to the first embodiment of the present invention. FIG. 2 is a plan view schematically showing part of the display shown in FIG. 1. A display 1 is, e.g., an organic EL display or liquid crystal display. The display includes a display panel 110, a driving circuit board 120 on which circuits (not shown) which drive the display panel 110 are mounted, and a connection means 130 for electrically connecting the display panel 110 to the driving circuit board 120. In this embodiment, the connection means 130 is a TCP (Tape Carrier Package) formed by mounting driving ICs 131 on flexible substrates 132.

The display panel 110 includes an insulating substrate 2 made of, e.g., glass. A display region 3 and a peripheral region outside it are defined on one major surface of the substrate 2.

A plurality of pixels (not shown) are arrayed in a matrix on the display region 3. Each pixel includes a pixel circuit and a display element.

A plurality of connection portions 4 are arrayed on the peripheral region along a side of the display panel 110. Each connection portion 4 includes terminal groups 5a to 5c and wiring line groups 6a to 6c.

A plurality of wiring lines included in the wiring line group 6a are connected to a plurality of terminals included in the terminal group 5a, respectively, and run along the array direction of the connection portions 4. A plurality of wiring lines included in the wiring line group 6b are connected to a plurality of terminals included in the terminal group 5b, respectively, and run along the array direction of the connection portions 4 in a direction reverse to that of the wiring lines included in the wiring line group 6a. The wiring lines included in the wiring line group 6a and those included in the wiring line group 6b are connected to each other between the adjacent connection portions 4.

A plurality of wiring lines included in the wiring line group 6c are connected to a plurality of terminals included in the terminal group 5c, respectively, and run toward the display region. The wiring line group 6c includes video signal lines or a combination of video signal lines and power supply wiring lines. These wiring lines are connected to the pixel circuits in the display region.

Scan signal line drivers 7a and 7b serving as first and second driving circuits are arranged on the peripheral region and sandwich the display region.

The wiring line group 6a of the connection portion 4 closest to the scan signal line driver 7a is connected to it through a scan signal line driver wiring line group 8a arranged on the peripheral region. A wiring line group 9a including scan signal lines or a combination of scan signal lines, power supply wiring lines, and control lines runs from the scan signal line driver 7a to the display region.

The wiring line group 6b of the connection portion 4 closest to the scan signal line driver 7b is connected to it through a scan signal line driver wiring line group 8b arranged on the peripheral region. A wiring line group 9b including scan signal lines or a combination of scan signal lines, power supply wiring lines, and control lines runs from the scan signal line driver 7b to the display region.

Wiring line groups arranged on a substrate such as a flexible tape and, for example, wiring line groups (not shown) arranged on the flexible substrates 132 of the TCP 130 are connected to the terminal groups 5a to 5c of the above-described display panel 110. Accordingly, a power or signal can be supplied from an external device to the internal circuits.

In this embodiment, connection only needs to be done for at least some of the wiring lines included in the terminal groups 5a to 5c. This is because in this embodiment, a power or signal is not supplied to all of the terminal groups 5a to 5c.

More specifically, in this embodiment, for each connection portion 4 located at the intermediate position of the array, which the connection portions 4 form, signals or both a power and signals are supplied to only the terminal group 5c. For the connection portion 4 located at the end portion on the side of the scan signal line driver 7a, the power and signals are supplied to only the terminal groups 5a and 5c. For the connection portion 4 located at the end portion on the side of the scan signal line driver 7b, the power and signals are supplied to only the terminal groups 5b and 5c.

As described above, in this embodiment, no power and signals are supplied to the wiring line groups 6a and 6b which are connected to each other. That is, the wiring lines included in the wiring line groups 6a and 6b are dummy wiring lines which are insulated from the power supply and signal source and do not contribute to the display operation.

Figure 3:
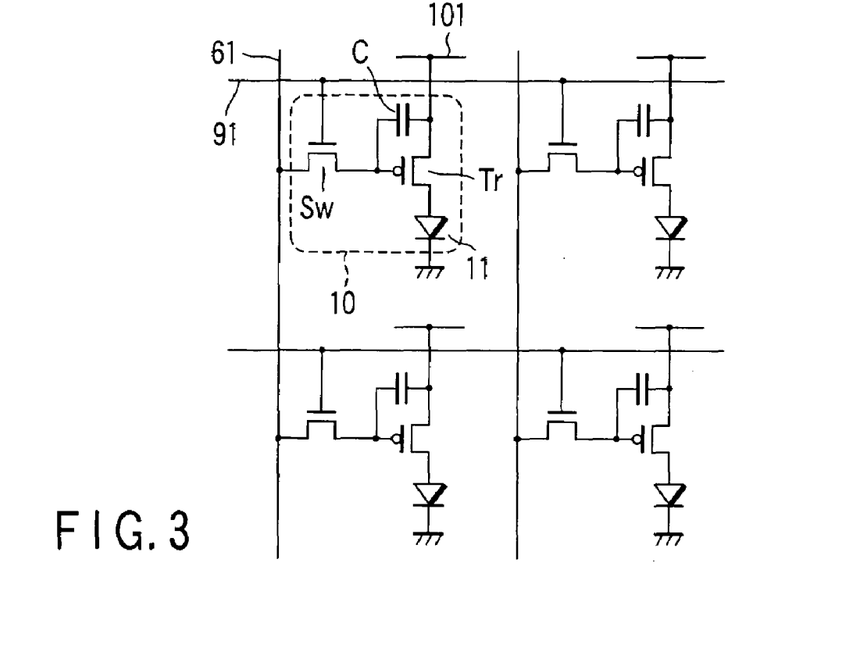
FIG. 3 is a view showing an example of a pixel structure which can be employed when the display panel shown in FIG. 2 is an organic EL display panel.
Figure 4:
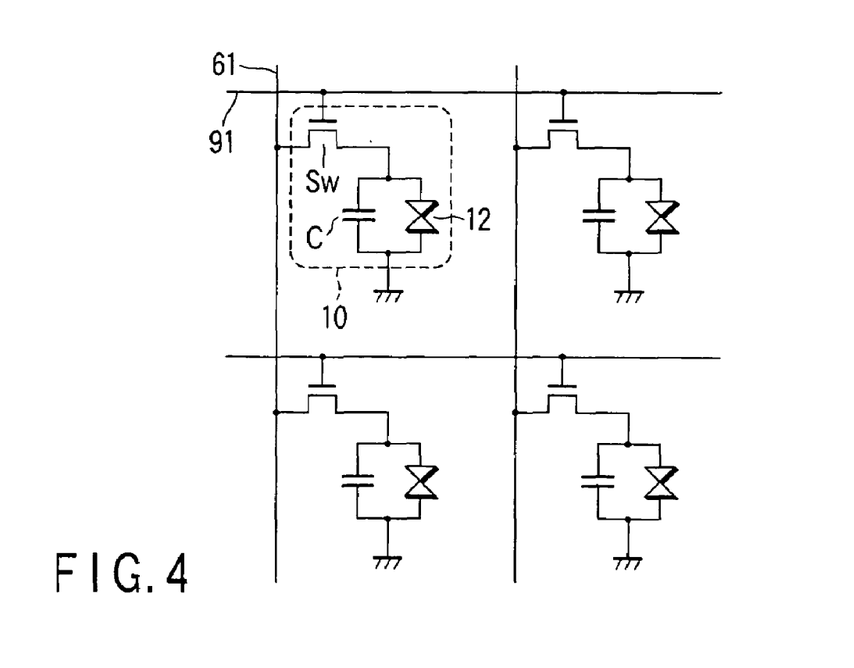
FIG. 4 is a view showing an example of a pixel structure which can be employed when the display panel shown in FIG. 2 is a liquid crystal display panel.

FIG. 3 is a view showing an example of a pixel structure which can be employed when the display panel shown in FIG. 2 is an organic EL display panel. FIG. 4 is a view showing an example of a pixel structure which can be employed when the display panel shown in FIG. 2 is a liquid crystal display panel.

A pixel 10 shown in FIG. 3 includes a pixel circuit which includes a selection switch Sw, capacitor C, and driving transistor Tr, and an organic EL element 11 serving as a display element. In this example, a scan signal line 91 is connected to at least part of the wiring line groups 9a and 9b. A video signal line 61 is connected to at least part of the wiring line group 6c. A power supply wiring line 101 is connected to at least part of the wiring line groups 6c, 9a, and 9b. In this example, the array substrate includes the insulating substrate 2, connection portions 4, scan signal line drivers 7a and 7b, wiring line groups 8a, 8b, 9a, and 9b, scan signal lines 91, video signal lines 61, power supply wiring line 101, and pixel circuits.

The pixel 10 shown in FIG. 4 includes a pixel circuit which includes the selection switch Sw and capacitor C, and a liquid crystal display element 12 serving as a display element. In this example, the scan signal line 91 is connected to the wiring line groups 9a and 9b. The video signal line 61 is connected to the wiring line group 6c. In this example, the array substrate includes the insulating substrate 2, connection portions 4, scan signal line drivers 7a and 7b, wiring line groups 8a, 8b, 9a, and 9b, scan signal lines 91, video signal lines 61, and pixel circuits.

In this embodiment, all the connection portions 4 are formed into the same shape, as shown in FIG. 2. This is advantageous in the following points. This will be described in comparison with FIG. 5.

Figure 5:
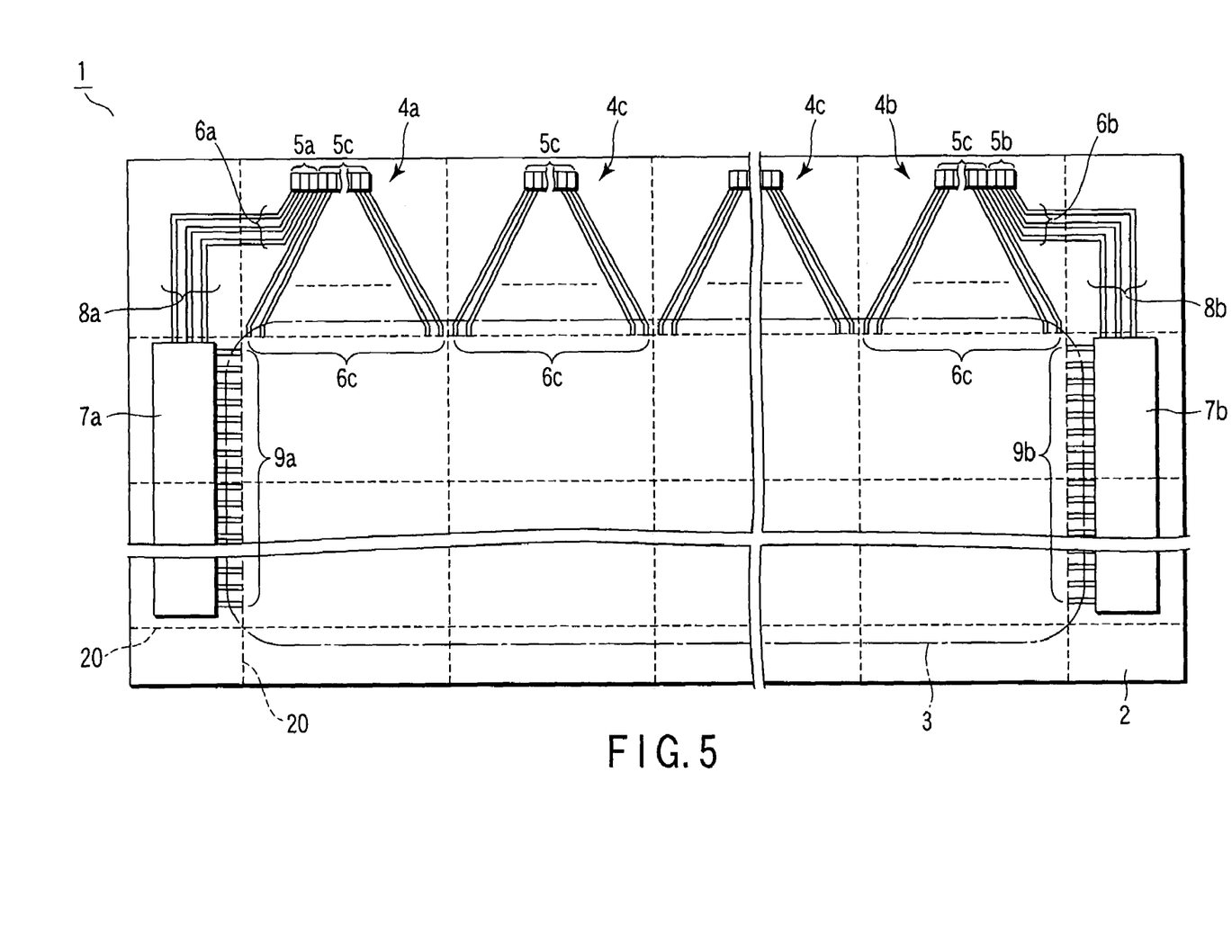
FIG. 5 is a plan view schematically showing a display panel according to Comparative Example 1.

FIG. 5 is a plan view schematically showing a display panel according to Comparative Example 1. A display panel 110 shown in FIG. 5 has the same structure as that of the display panel 110 shown in FIG. 2 except that connection portions 4a to 4c are arranged in place of the connection portions 4.

In manufacturing the display panels 110 shown in FIGS. 2 and 5, the terminal groups 5a to 5c, wiring line groups 6a to 6c, wiring line groups 8a and 8b, and video signal lines 61 are formed by the same photography process. More specifically, first, a conductive layer and photoresist film are sequentially formed on the substrate 2. Next, the photoresist film is pattern-exposed and developed to obtain a resist pattern. The conductive layer is etched by using the resist pattern as an etching mask. Accordingly, the terminal groups 5a to 5c, wiring line groups 6a and 6b, wiring line groups 8a and 8b, and video signal lines 61 are obtained.

Pattern exposure of the photoresist film is executed in the following way. For example, the display region and peripheral region are segmented as indicated by broken lines 20 in FIGS. 2 and 5. Exposure of the photoresist film is sequentially done for each segmented part. In this case, in obtaining the structure shown in FIG. 2, the number of kinds of patterns to be formed on a reticle can be smaller by two than for the structure shown in FIG. 5. As described above, the number of mask patterns to be used for the photolithography process can be minimized.

For this reason, by employing the structure shown in FIG. 2, the number of times of reticle exchange can be reduced, or reticle exchange itself can be omitted if reticle exchange is necessary for obtaining the structure shown in FIG. 5. Hence, the time necessary for reticle exchange or cost generated by preparing a plurality of reticles can be reduced.

If reticle exchange is not necessary for obtaining the structure shown in FIG. 5, the size of each pattern formed on the reticle can be increased. Accordingly, the number of shots can be reduced.

According to this embodiment, the time required for the exposure step can be shortened, and the manufacturing cost can be reduced.

In this embodiment, the same mask pattern formed on one reticle is used in all exposure cycles for forming the wiring lines to be connected to the video signal lines 61. For this reason, the video signal lines and/or power supply wiring lines formed on the display region 3 can have the same shape. The variation in wiring line pattern shape caused by the manufacturing process can be reduced. Hence, the variation in wiring capacitance can be reduced, and a display with a high display quality can be implemented.

When the structure shown in FIG. 2 is employed, the following effects can be obtained.

Figure 6:
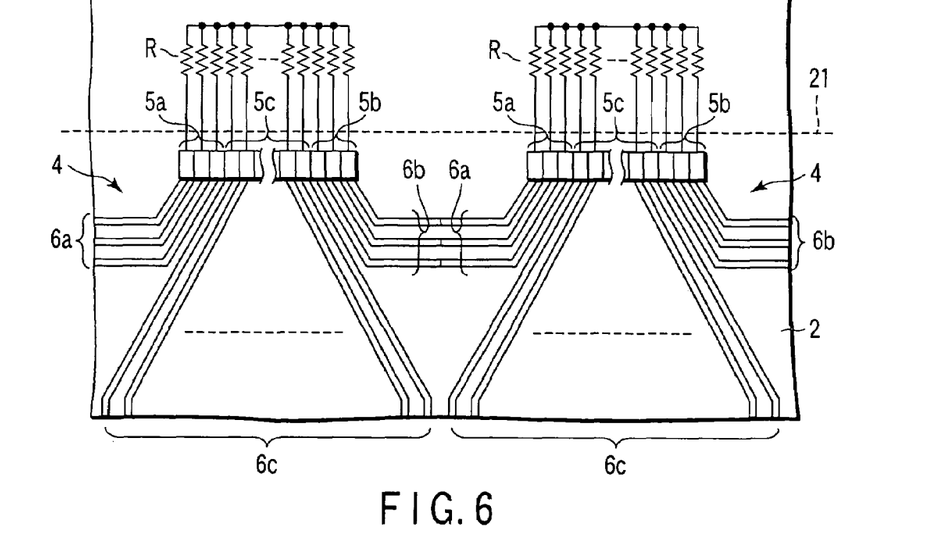
FIG. 6 is a plan view schematically showing an example of a method which can be used to manufacture the display panel shown in FIG. 2.
Figure 7:
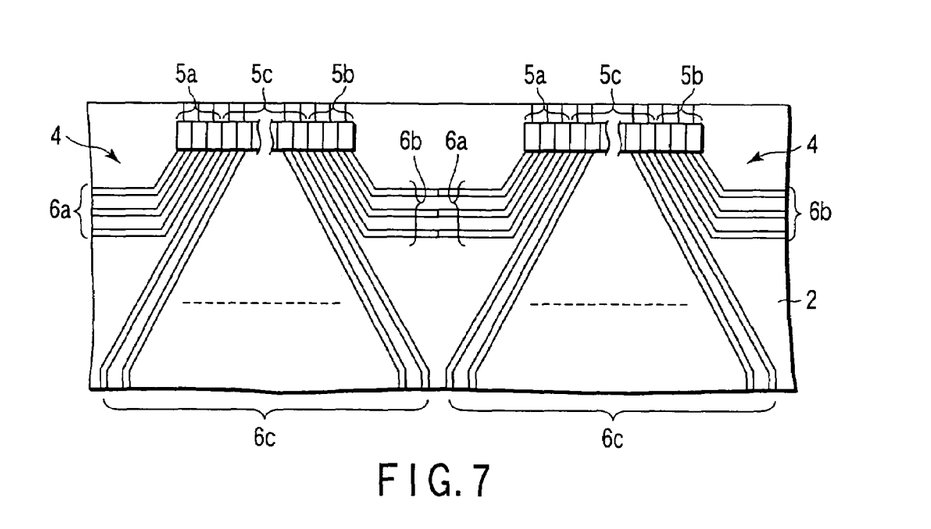
FIG. 7 is a plan view schematically showing the example of the method which can be used to manufacture the display panel shown in FIG. 2.

FIGS. 6 and 7 are plan views schematically showing an example of a method which can be used to manufacture the display panel 110 shown in FIG. 2.

In the structure shown in FIG. 6, short-ring resistors R are arranged on a region located outside the peripheral region in correspondence with terminals included in the terminal groups 5a to 5c, i.e., OLB pads. The terminals included in the terminal groups 5a to 5c in each of the connection portions 4 are connected through the resistors R. When this structure is employed, a wiring line included in the wiring line group 6a which is located farthest from the display region, a wiring line included in the wiring line group 6b which is located farthest from the display region, and the resistors R are connected to each other to form a guard ring which prevents ESD (Electro-Static Damage) breakdown in a thin-film transistor (TFT). Hence, when the display panel 110 is, e.g., a liquid crystal display panel, and a rubbing process is executed after formation of a TFT array, the TFTs can be prevented from causing ESD breakdown due to electro-static discharge to an external structure.

The wiring lines which connect the terminals included in the terminal groups 5a to 5c are cut at some stage. For example, when the substrate 2 is cut along, e.g., a broken line 21 in, e.g., a normal scribing step, the terminals included in the terminal groups 5a to 5c are insulated from each other, as shown in FIG. 7.

This structure is also advantageous for preventing ESD breakdown even after the terminals included in the terminal groups 5a to 5c are insulated.

Figure 8:
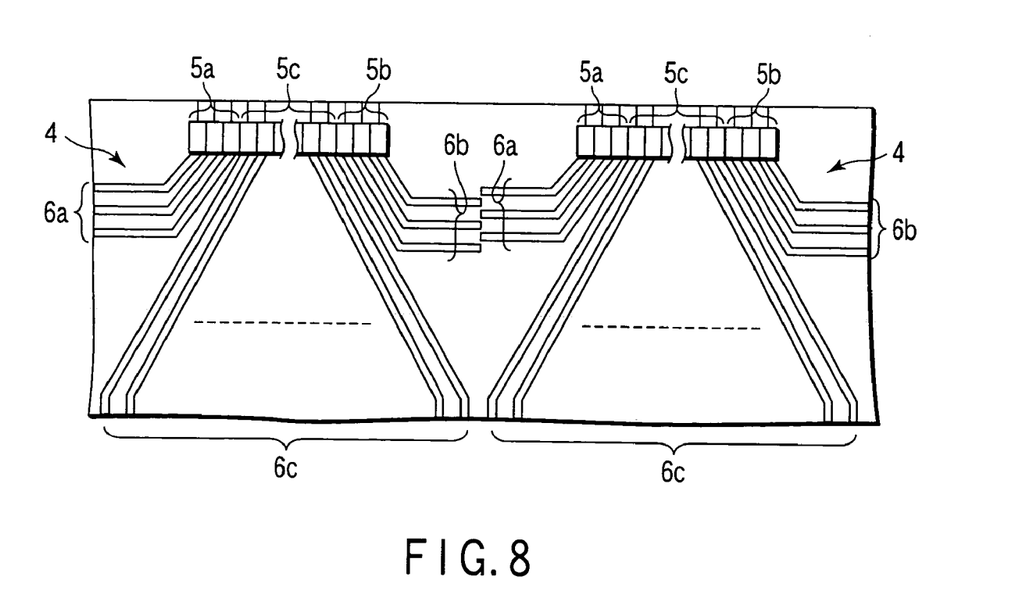
FIG. 8 is a plan view schematically showing part of a display panel according to Comparative Example 2.

FIG. 8 is a plan view schematically showing part of a display panel according to Comparative Example 2. In the structure shown in FIG. 8, the wiring line groups 6a and 6b between the adjacent connection portions 4 are not connected. In this structure, if electrostatic discharge occurs between the external structure and a terminal included in the terminal group 5b of the connection portion 4 on the left side and, in this example, the terminal located closest to the terminal group 5c, discharge may occur between the wiring line connected to the terminal and other circuits on the substrate 2.

To the contrary, the wiring line groups 6a and 6b between the adjacent connection portions 4 are connected, as shown in FIG. 7. Even if electrostatic discharge occurs between the external structure and a terminal included in the terminal group 5b of the connection portion 4 on the left side, the probability of discharge between the wiring line and other circuits on the substrate 2 decreases because the wiring line connected to that terminal is connected to the wiring line of the connection portion 4 on the right side. Hence, ESD breakdown can be suppressed.

The second embodiment will be described next.

Figure 9:
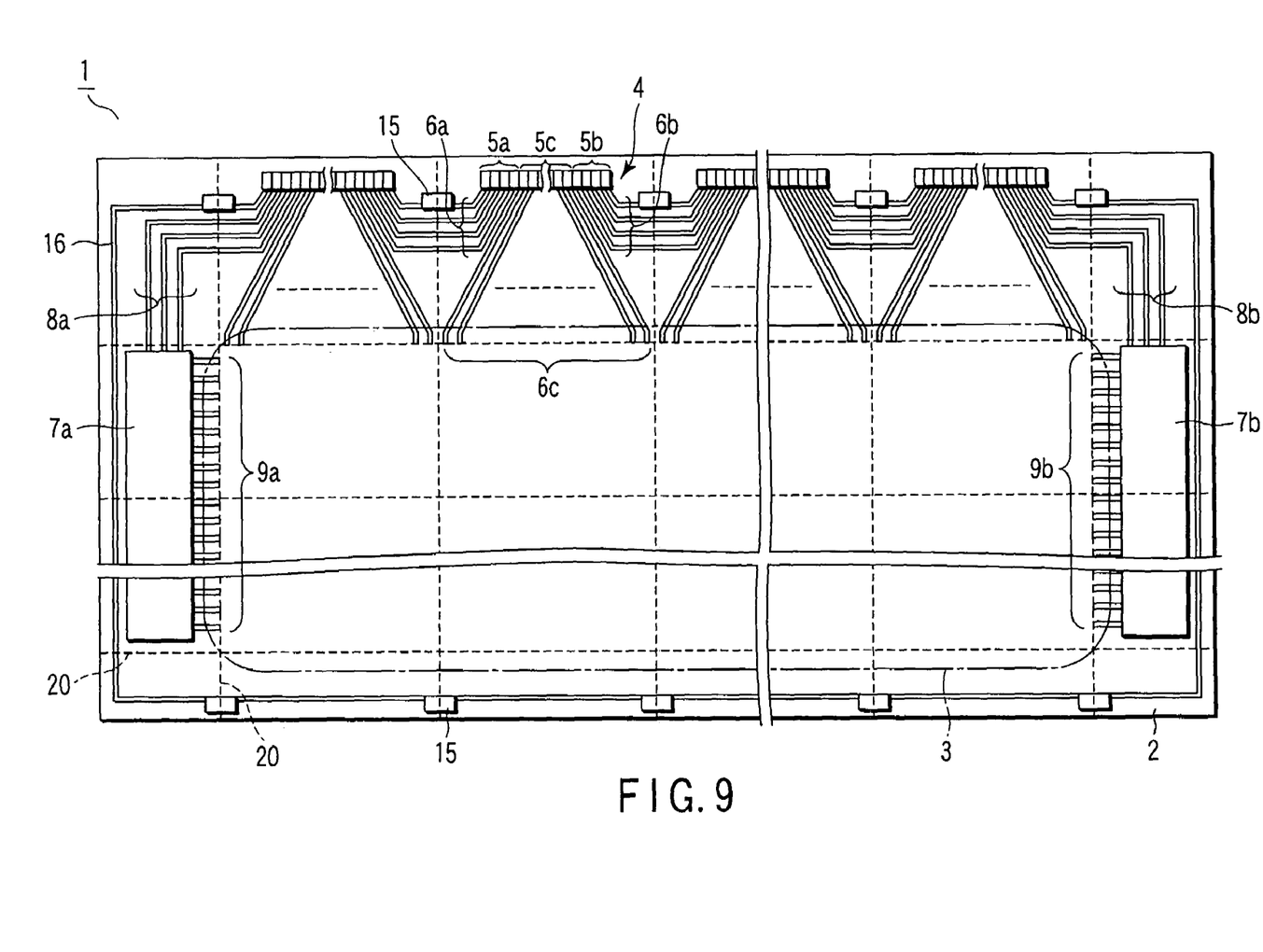
FIG. 9 is a plan view schematically showing part of a display according to the second embodiment of the present invention.

FIG. 9 is a plan view schematically showing part of a display according to the second embodiment of the present invention. The display according to this embodiment has almost the same structure as that of the display according to the first embodiment except the following point. In this embodiment, as shown in FIG. 9, a display panel 110 has a terminal 15 and a wiring line 16. The wiring line 16 surrounds the display region. The terminal 15 is arranged along the wiring line 16 and a wiring line included in wiring line groups 6*a* and 6*b* which is farthest from the display region. When the terminal 15 is used, any of the wiring lines included in the wiring line groups 6*a* and 6*b* can be used. The wiring line is not limited to that farthest from the display region.

When this structure is employed, and the display panel 110 is a liquid crystal display panel, the terminal 15 and wiring line 16 can be used as a transfer pad and a common wiring line, respectively. When the display panel 110 is an organic EL display panel 110, the terminal 15 and wiring line 16 can be used as a contact pad and a cathode supply wiring line, respectively.

In this embodiment, as described above, the terminal 15 is used as a transfer pad or contact pad. Hence, in this embodiment, of the wiring lines included in the wiring line groups 6*a* and 6*b* connected to each other, only wiring lines which are not connected to the terminal 15 correspond to dummy wiring lines. In this embodiment, the dummy wiring lines need not exist. That is, the terminals 15 may be arranged for all wiring lines included in the wiring line groups 6*a* and 6*b* connected to each other.

The power supply or signal source connected to the wiring line groups 6*a* and 6*b* can be arranged either on the substrate 2 or on an external circuit.

The third embodiment will be described next.

Figure 10:
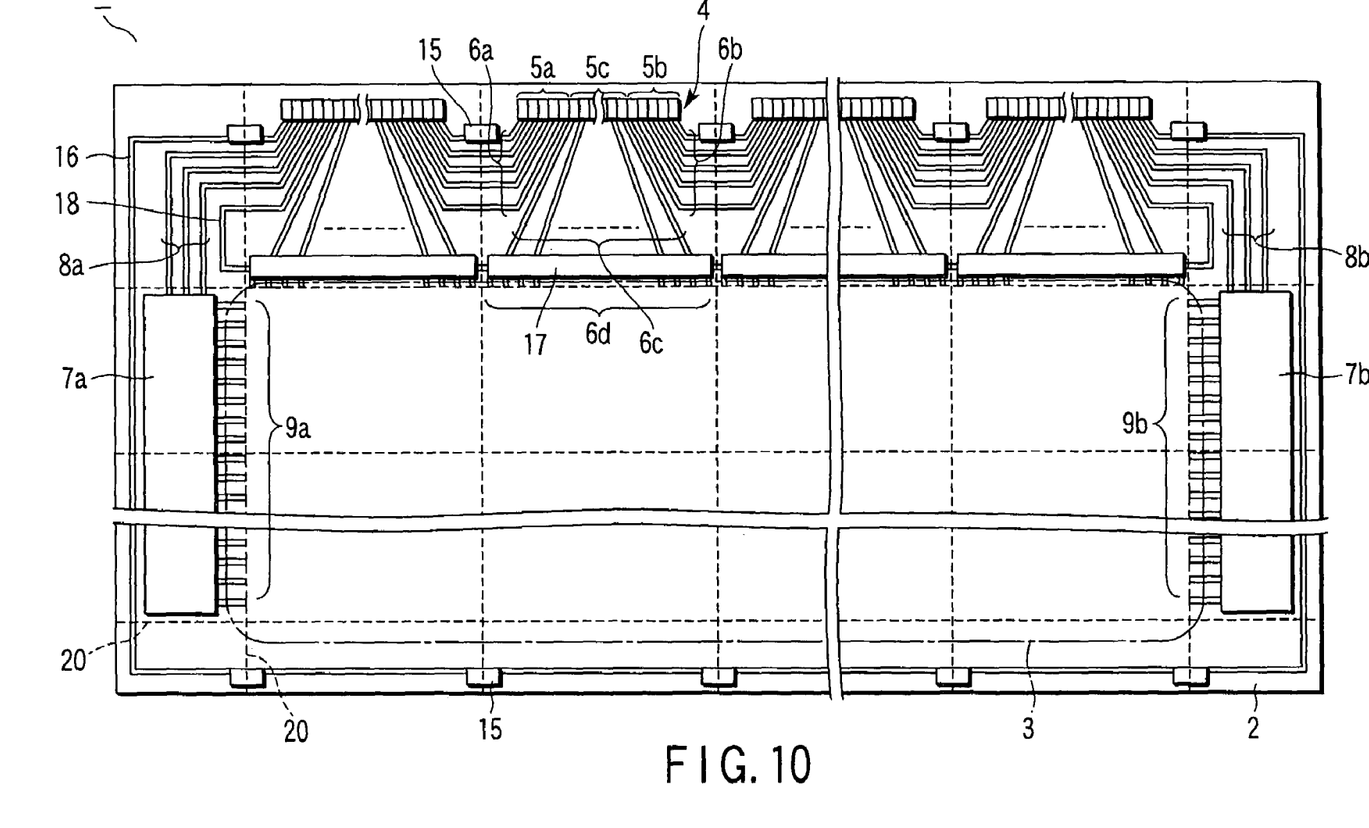
FIG. 10 is a plan view schematically showing part of a display according to the third embodiment of the present invention.

FIG. 10 is a plan view schematically showing part of a display according to the third embodiment of the present invention. The display according to this embodiment has almost the same structure as that of the display according to the second embodiment except the following point. In this embodiment, as shown in FIG. 10, part of a video signal line driver and, in this example, distribution circuits 17 are arranged in the peripheral region of a display panel 110. The distribution circuit 17 supplies a video signal to video signal lines through a wiring line group 6*d* in accordance with a signal supplied through a wiring line group 6*c* and a wiring line 18. In this way, various modifications or additions can be done for a connection portion 4.

In the first to third embodiments, the display region 3 is segmented, as shown in FIGS. 2, 9, and 10, and exposure of the photoresist film is executed seuentialy for each segmented part. That is, sequential exposure has been described. In the display region 3, exposure of the photoresist film need not be executed sequentially for each part segmented by the broken line 20. For example, exposure of the photoresist film may be executed at once for the entire display region. That is, full plate exposure may be executed.

Normally, the interval between the wiring lines included in the wiring line groups 6*a* to 6*c* is very small near the terminal groups 5*a* to 5*c*. Normally, the interval between the terminals included in the terminal groups 5*a* to 5*c* is also very small. That is, the pattern density on the peripheral region is normally very high. Pattern exposure on the peripheral region must be done at a very high accuracy.

To the contrary, the pattern density on the display region is normally lower than on the peripheral region. Not so high accuracy as on the peripheral region is required for pattern exposure on the display region.

For these reasons, even when, for example, pattern exposure of the photoresist film is executed at once for the entire display region to reduce the number of shots, a sufficiently high accuracy can be realized. Examples of members on the display region which can be formed by such a process are an insulating film such as a passivation film having through holes to connect the pixel circuits to the pixel electrodes of the display elements, a color filter, and a columnar spacer.

Even for the peripheral region, stepping exposure need not always be executed in all exposure steps. Full plate exposure may be performed in exposure steps to form some constituent elements. Full plate exposure for forming certain constituent elements on the display region 3 and full plate exposure for forming certain constituent elements on the peripheral region may simultaneously be executed.

In this technique, it is important to form all wiring lines to be connected to the video signal lines by sequential exposure using the same mask pattern. Hence, various structures can be employed for portions in the peripheral region except the connection portions 4.

Figure 11:
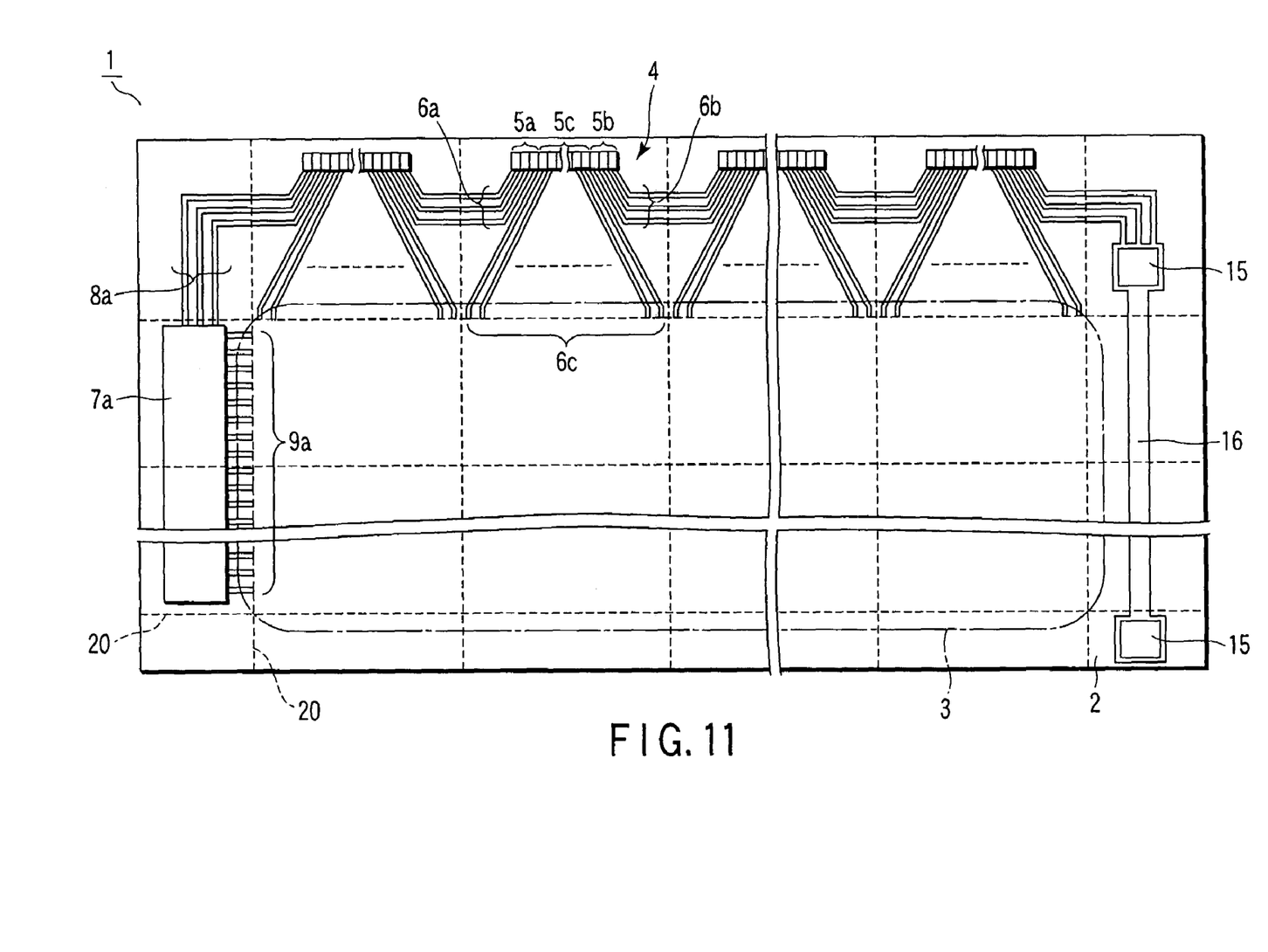
FIG. 11 is a plan view schematically showing part of a display according to a modification.

For example, in the first to third embodiments, the scan signal line drivers 7*a* and 7*b* are arranged on both sides of the display region 3. As shown in FIG. 11, one of the scan signal line drivers 7*a* and 7*b* and, in this example, only the scan signal line driver 7*a* may be arranged.

In this case, for example, the terminal 15 and wiring line 16 may be arranged on the opposite side of the portion at which the scan signal line driver 7*a* is arranged in the peripheral region via the display region 3. When the display 1 is an organic EL display, the terminal 15 may be connected to a cathode voltage supply terminal. When the display 1 is a liquid crystal display, the terminal 15 may be connected to a common voltage supply terminal on a counter substrate. This structure is advantageous in preventing static electricity or the like from entering the substrate.

Figure 12:
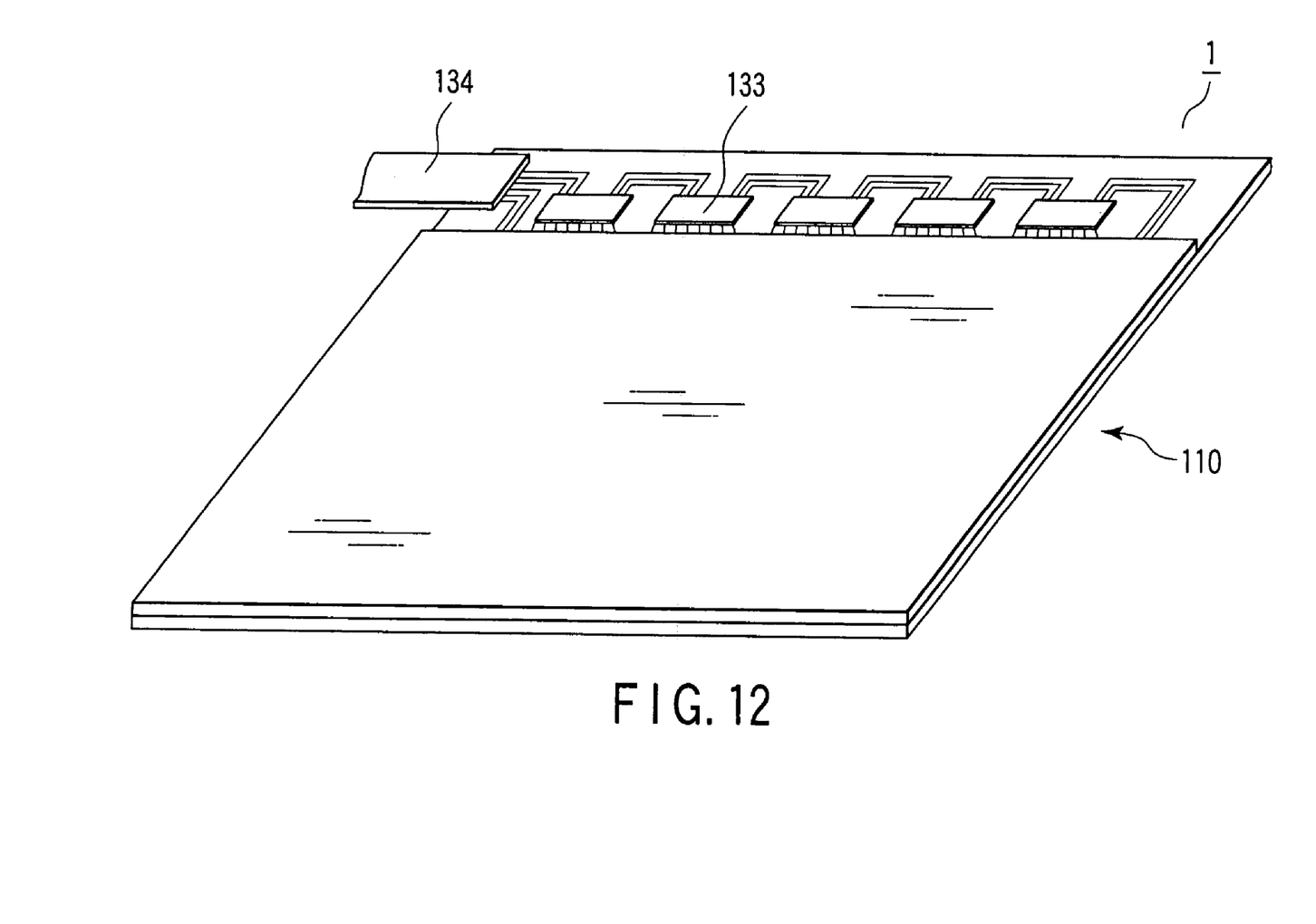
FIG. 12 is a perspective view schematically showing a display according to another modification.
Figure 13:
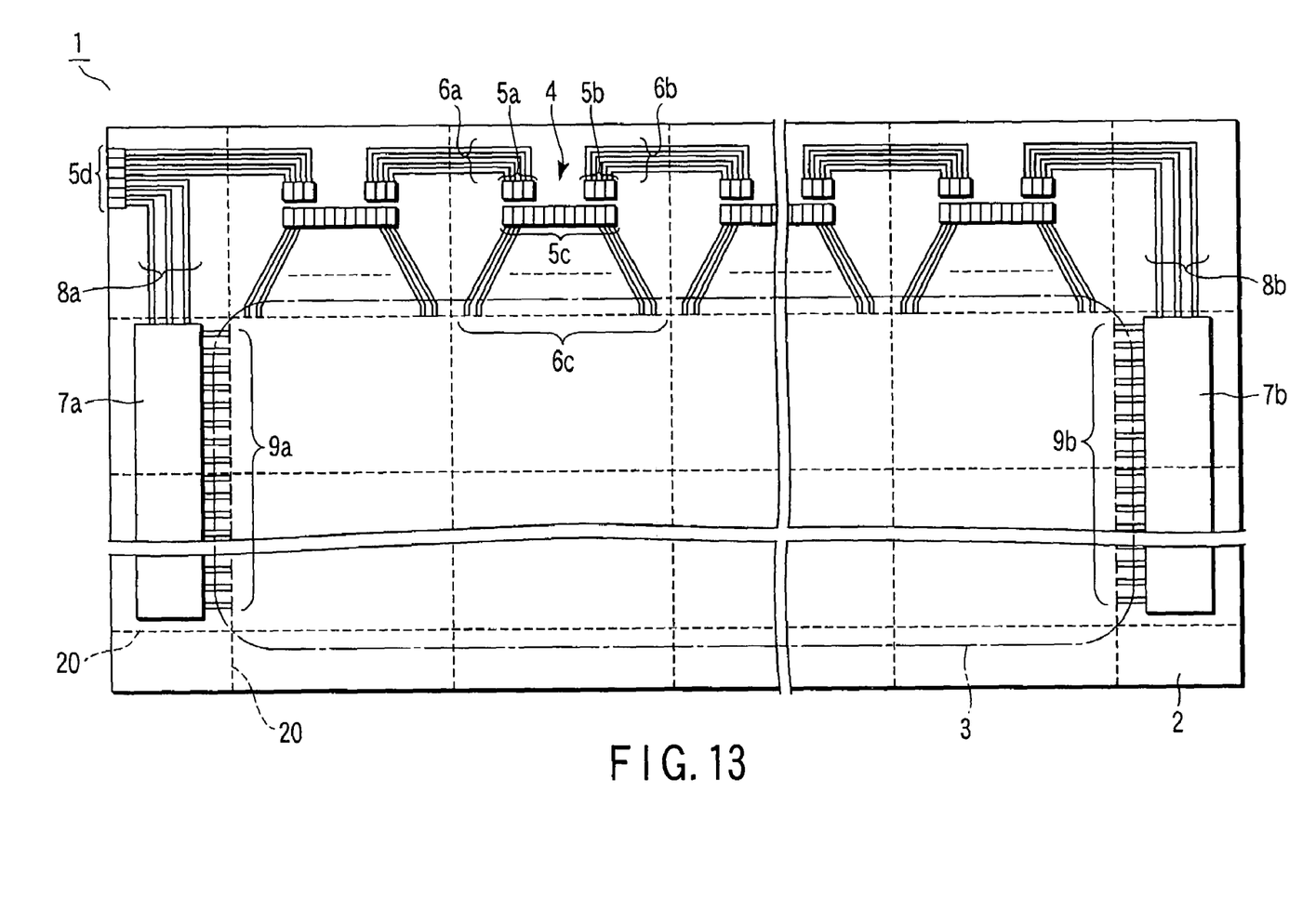
FIG. 13 is a plan view schematically showing part of the display shown in FIG. 12.

In the first to third embodiments, the structure in which the driving IC 131 is mounted on the flexible substrate 132 is employed. However, other structures may be employed. For example, as shown in FIG. 12, driving ICs 133 may be COG-mounted. Referring to FIG. 12, reference numeral 134 denotes a flexible substrate. FIG. 13 is a plan view schematically showing part of the display shown in FIG. 12 and, more specifically, the array substrate. Referring to FIG. 13, reference numeral 5*d* denotes a terminal group to connect the wiring line group on the flexible substrate 134 to the wiring line groups 6*a* and 8*a*.

In the first to third embodiments, the scan signal line drivers 7*a* and 7*b* are formed on the insulating substrate 2. The scan signal line drivers 7*a* and 7*b* need not always be formed on the insulating substrate 2. For example, the scan signal line drivers 7*a* and 7*b* may be COG-mounted on the insulating substrate 2.

In the first to third embodiments, the present invention is applied to formation of the connection portions 4 to connect an external circuit to the video signal lines. The present invention can also be applied to formation of other portions. For example, the present invention may be applied to formation of connection portions to connect an external circuit to the scan signal lines.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A method of manufacturing a wiring board comprising an insulating substrate which includes a first and second regions adjacent to each other in one major surface, signal lines arrayed on the first region, and wiring patterns which is arrayed on the second region and each includes a first connection wiring line connecting the signal line to a signal input terminal, a second connection wiring line electrically disconnected from the signal line, and a third connection wiring line electrically disconnected from the signal line, the second and third connection wiring lines being connected to each other between each adjacent wiring patterns, and all of the signal lines being connected to the first connection wiring lines of the wiring patterns, comprising:

forming each of the wiring patterns by a photolithography process, wherein, in the photolithography process, pattern exposure using a single photomask which includes a pattern having a shape corresponding to part of the wiring patterns is sequentially executed for all parts of the second region, and wherein forming the wiring patterns is carried out such that resistors which mutually connect the first to third connection wiring lines included in the same wiring pattern are formed on a third region in the major surface of the insulating substrate, the third region being adjacent to the first region via the second region, and wherein the method further comprises:

cutting the insulating substrate at a boundary between the second and third regions to disconnect the first to third connection wiring lines included in the same wiring pattern from one another.

2. The method according to claim 1, wherein forming the wiring patterns comprises:

forming a conductive layer on the insulating substrate;
forming a photoresist layer on the conductive layer;
sequentially executing pattern exposure of the photoresist layer through the photomask for all parts of the second region;
developing the exposed photoresist layer to form a resist pattern; and
etching the conductive layer by using the resist pattern as an etching mask.

3. The method according to claim 1, further comprising:

before cutting the insulating substrate, forming pixel circuits on the first region, the pixel circuits being connected to the signal lines.

4. A wiring board comprising:

an insulating substrate which includes a first and second regions adjacent to each other in one major surface;
signal line groups each of which includes first signal lines arrayed in a first direction on the first region and which are arrayed in the first direction; and
connection portions each of which is arranged on the second region in correspondence with the signal line group,
wherein each of the connection portions comprises first to third terminal groups, a first wiring line group connecting the first terminal group to the corresponding signal line group, a second wiring line group connected to the second terminal group, and a third wiring group connected to the third terminal group, wherein the second and third wiring line groups are connected to each other between each adjacent connection portions, and wherein all of the connection portions are the same in shapes of the first to third terminal groups and the first to third wiring line groups.

5. The wiring board according to claim 4, further comprising:

second signal lines arrayed on the first region in a second direction substantially perpendicular to the first direction; and
a first driving circuit which is disposed on the second region and supplies the second signal line with a scan signal,
wherein the second wiring line group of the connection portion located on one end is connected to the first driving circuit.

6. The wiring board according to claim 5, further comprising:

a second driving circuit which is disposed on the second region and opposes the first driving circuit via the first region,
wherein the second signal lines and the third wiring line groups of the connection portion located on the other end are connected to the second driving circuit.

7. The wiring board according to claim 5, further comprising:

third signal lines arrayed on the second region in the second direction;
a second driving circuit which is disposed on the second region and opposes the first driving circuit via the first region,
wherein the third signal lines and the third wiring line group of the connection portion located on the other side are connected to the second driving circuit.

8. The wiring board according to claim 4, wherein at least one wiring line of the second and third wiring line groups connected to each other between the adjacent connection portions is a dummy wiring line which is insulated from a power supply and a signal source.

9. The wiring board according to claim 4, wherein at least one wiring line of the second and third wiring line groups connected to each other between the adjacent connection portions is connected to a power supply or a signal source.

10. A display comprising:

the wiring board according to claim 4; and
display elements connected to the pixel circuits, respectively.

11. The display according to claim 10, wherein the display elements are liquid crystal display elements.

12. The display according to claim 10, wherein the display elements are liquid crystal organic EL elements.

13. The method according to claim 1, wherein the second and third wiring lines connected to each other between the adjacent wiring patterns are dummy wirings insulated from a power supply and a signal source.

* * * * *